(12) United States Patent
Tavares Andre

(10) Patent No.: US 10,877,461 B2
(45) Date of Patent: Dec. 29, 2020

(54) SYSTEM AND METHOD FOR OPERATING A CUTTING MACHINE

(71) Applicant: CHETOCORPORATION, S.A., Oliveira de Azemeis (PT)

(72) Inventor: Sergio David Tavares Andre, Vale de Cambra (PT)

(73) Assignee: CHETOCORPORATION, S.A., Oliveira de Azemeis (PT)

( * ) Notice: Subject to any disclaimer, the term of this patent is extended or adjusted under 35 U.S.C. 154(b) by 12 days.

(21) Appl. No.: 16/337,656

(22) PCT Filed: Sep. 1, 2017

(86) PCT No.: PCT/IB2017/055280
§ 371 (c)(1),
(2) Date: Mar. 28, 2019

(87) PCT Pub. No.: WO2018/060789
PCT Pub. Date: Apr. 5, 2018

(65) Prior Publication Data
US 2020/0033830 A1  Jan. 30, 2020

(30) Foreign Application Priority Data

Sep. 28, 2016 (PT) .......................... 109638

(51) Int. Cl.
*G05B 19/4062* (2006.01)
(52) U.S. Cl.
CPC ............ *G05B 19/4062* (2013.01); *G05B 2219/32021* (2013.01); *G05B 2219/43146* (2013.01); *G05B 2219/49092* (2013.01)

(58) Field of Classification Search
CPC ...... G05B 19/4062; G05B 2219/32021; G05B 2219/43146; G05B 2219/49092; Y02P 70/161; Y02P 90/205
See application file for complete search history.

(56) References Cited

U.S. PATENT DOCUMENTS

| 8,091,652 | B2* | 1/2012 | Sinnerstad | ............. E21B 44/02 175/24 |
| 9,593,567 | B2* | 3/2017 | Pink | ....................... E21B 44/00 |

(Continued)

FOREIGN PATENT DOCUMENTS

| EP | 2871547 A1 | 5/2015 |
| EP | 2955319 A1 | 12/2015 |

(Continued)

OTHER PUBLICATIONS

International Search Report and Written Opinion for International Application No. PCT/IB2017/055280 (15 Pages) (dated Apr. 6, 2018).

*Primary Examiner* — Abdelmoniem I Elamin
(74) *Attorney, Agent, or Firm* — Lucas & Mercanti, LLP

(57) ABSTRACT

The technology herein developed arises from the need to monitor and automate the entire deep hole drilling, drilling and milling processes, in cutting machines, in order to not only optimize the relevant task performance but also to increase the useful life of the cutting tools involved. An operating system and method are disclosed that allow controlling the entire deep hole drilling, drilling and milling processes, acting directly and automatically on the control of the cutting parameters, such as for example drilling feed and cooling adjustment, by means of collecting and real-time analyzing of data from sensors arranged in said cutting machine.

14 Claims, 3 Drawing Sheets

(56) References Cited

U.S. PATENT DOCUMENTS

| | | | |
|---|---|---|---|
| 9,727,050 B2* | 8/2017 | Willis | G05B 19/4065 |
| 10,401,823 B2* | 9/2019 | Wang | G05B 19/4062 |
| 10,581,228 B2* | 3/2020 | Ayabakan | G05B 19/418 |
| 2010/0108381 A1* | 5/2010 | Sinnerstad | E21B 44/02 |
| | | | 175/24 |
| 2014/0353033 A1* | 12/2014 | Pink | E21B 44/00 |
| | | | 175/27 |
| 2015/0212512 A1* | 7/2015 | Butler | B23D 59/001 |
| | | | 700/180 |
| 2016/0026173 A1 | 1/2016 | Willis et al. | |
| 2016/0132033 A1* | 5/2016 | Kao | G05B 19/048 |
| | | | 700/291 |
| 2017/0160718 A1* | 6/2017 | Tanabe | G05B 19/4188 |
| 2017/0227945 A1* | 8/2017 | Wang | G05B 19/182 |
| 2017/0274489 A1* | 9/2017 | Baratta | G06Q 30/0645 |
| 2019/0384252 A1* | 12/2019 | Wang | G05B 19/4069 |

FOREIGN PATENT DOCUMENTS

| | | |
|---|---|---|
| WO | 2008127173 A1 | 10/2008 |
| WO | 2013082498 A2 | 6/2013 |
| WO | 2016148880 A1 | 9/2016 |

* cited by examiner

SYSTEM AND METHOD FOR OPERATING A CUTTING MACHINE

CROSS-REFERENCE TO RELATED APPLICATIONS

This application is a 371 of PCT/IB2017/055280 filed Sep. 1, 2017, which claims the benefit of Portuguese Patent Application No. 109638, filed Sep. 28, 2016, both applications are incorporated herein by reference.

TECHNICAL DOMAIN

The present application describes an operating system and method for controlling the operation of cutting machines, which enables controlling the deep hole drilling, drilling and milling processes.

SUMMARY

A control operation system for a cutting machine is disclosed characterized in that it comprises
- a central control unit provided with processing capacity and internal storage memory, said central control unit further comprising a communication module specially configured to establish a communication for transferring control information with the cutting machine and for receiving sensorial data from a sensory block;
- a sensory block, comprising a set of sensors which are coupled to the cutting machine;
- an interface device, directly connected to the central control unit, adapted to establish a bidirectional communication with the operator either for inputting initial parameterizations or for displaying control information;
- an alarm mechanism;
- a manual control button.

In a particular embodiment of the system, the sensory block comprises at least two power sensors, at least one flow rate sensor, at least one pressure sensor and at least one vibration sensor.

In a particular embodiment of the system, the at least two power sensors are coupled to the rotating axis and to the linear axis of the cutting machine motor, respectively.

In a particular embodiment of the system, the at least one flow rate sensor and the at least one pressure sensor are coupled to the cooling circuit associated with the cutting machine.

In a particular embodiment of the system, the at least one vibration sensor is coupled to the rotating axis of the cutting machine motor.

In a particular embodiment of the system, the interface device comprises a screen with tactile technology.

In a particular embodiment of the system, the manual control button is of the potentiometer type.

A method for operating a cutting machine is also disclosed, which is executed in said system, characterized in that the central control unit is adapted to monitor and control the operation of the cutting machine automatically and in real time, starting from the initial parameterization input by an operator taking the type of material intended for drilling into account by processing and analyzing the data sent from the sensory block in order to perform the detection of intersections and adjust the cutting parameters:
- drilling feed acting directly on the cutting machine motor which coordinates the power delivered to the rotating and linear axes;
- cooling of the cutting tool, acting directly on the cooling circuit of the cutting machine;
- vibrating of the rotating axis of the cutting machine;

wherein the adjustment of the drilling feed and the intersection detection, the cooling control and the vibration control are performed by comparing the values collected by the power, pressure or flow rate and vibration sensors, respectively, with the values of the cutting parameters programmed in the initial parameterization carried out by the operator.

In a particular embodiment of the method, the drilling feed adjustment step is triggered when the total electric power consumed by the rotating and linear axes is higher than the value initially programmed by the operator.

In a particular embodiment of the method, the detection of intersections involves continuous monitoring of the power curve of the rotary motor by calculating the derivative at a point in the curve in order to obtain the slope of the tangent line at that same point.

In a particular embodiment of the method, the intersection is detected when the slope of the line is negative, for a time and amplitude constant previously defined by the operator in the initial parameterization.

In a particular embodiment of the method, the control unit stores in memory the initial parameterization carried out by the operator, updates of said cutting parameters throughout the cutting process, and specific parameterizations associated with past works, indexed to the type of material intended for cutting.

In a particular embodiment of the method, the control unit automatically loads specific cutting parameters when an intersection is detected.

In a particular embodiment of the method the operator can take control of the cutting machine by actuating the manual button.

GENERAL DESCRIPTION

The present application describes an operating system and method for operating cutting machines, which enables controlling the deep hole drilling, drilling and milling processes.

The method developed is executed in a central control unit which coordinates the operation of said cutting machine, which may be an internal or external module to the machine itself. Said central control unit is provided with processing and storage capacity, further comprising a communication module with the outside, specially configured for sensory communication. In fact, the method herein presented uses the information collected by a specific set of sensors that monitor certain variables that intervene in the deep hole drilling, drilling and milling processes, allowing, when appropriate, the automatic adjustment of the cutting parameters, such as for example drilling feed or cooling adjustment, without operator intervention, in order to maintain optimal cutting conditions throughout the entire process.

This automatic and real-time control directly results in increasing the useful life of the cutting tools, as well as allows an optimization of future cutting processes, allowing to store cutting parameters indexed to the type of material intended for cutting. This teaching is done without any intervention of the operator throughout the entire process, except for the initial settings which have to be input into the machine in order to trigger the process.

In addition, continuous monitoring executed by the control method herein developed further allows the detection of intersections along the material, enabling controlled guidance before, during and after the intersection, except once again upon any action of the operator in that process.

BRIEF DESCRIPTION OF THE FIGURES

For a more complete understanding of the present application, drawings are hereinafter attached, which represent a preferred embodiment which, however, is not intended to limit the technique disclosed herein.

DETAILED DESCRIPTION

Figure 1:
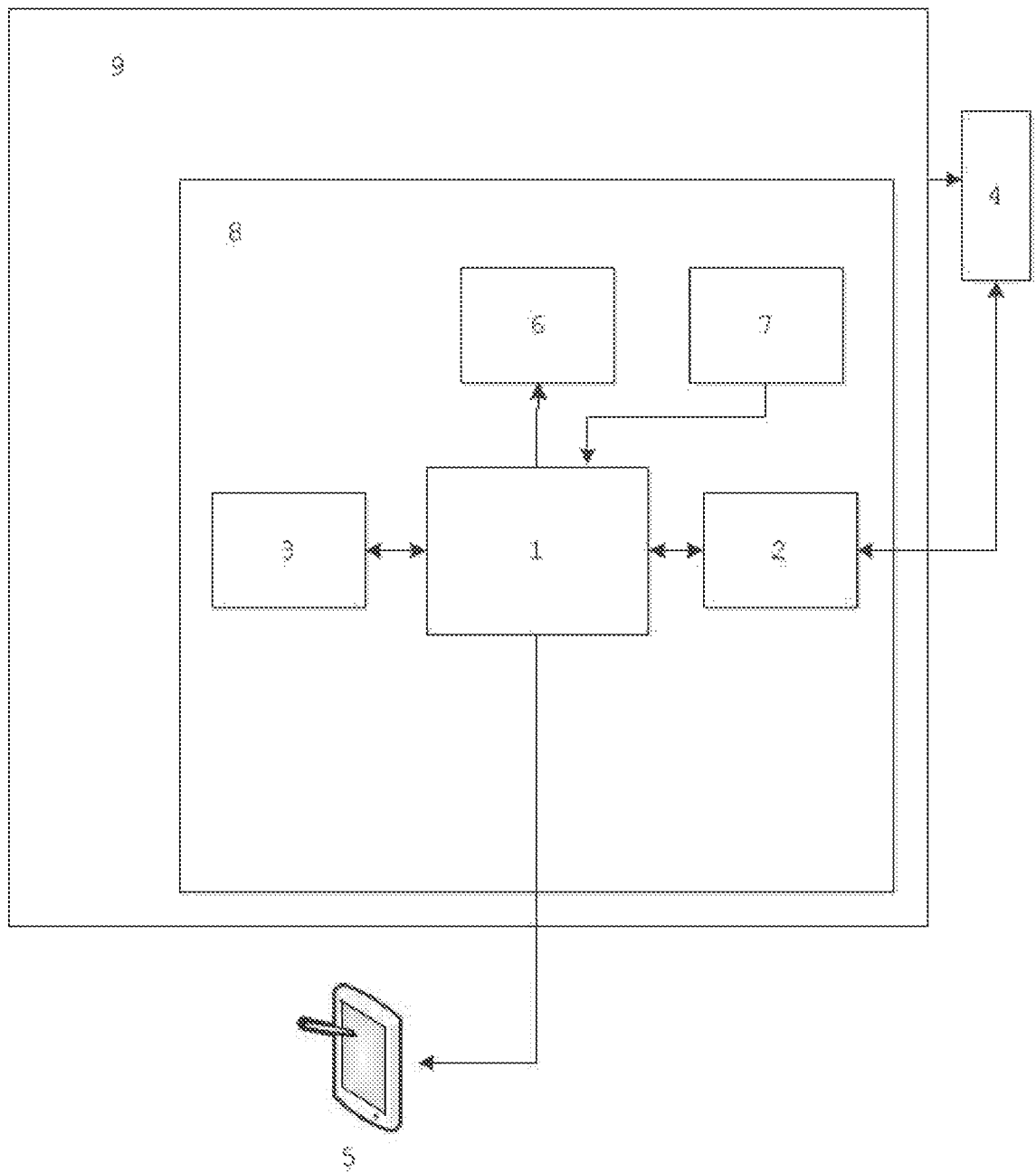
FIG. 1 shows the operating system of the cutting machine, namely all structural blocks forming part of the central control unit, wherein reference numbers represent:
1—processing unit;
2—communication module;
3—internal memory unit;
4—sensory block;
5—interface device;
6—alarm mechanism;
7—manual control button;
8—central control unit;
9—cutting machine.
Figure 2:
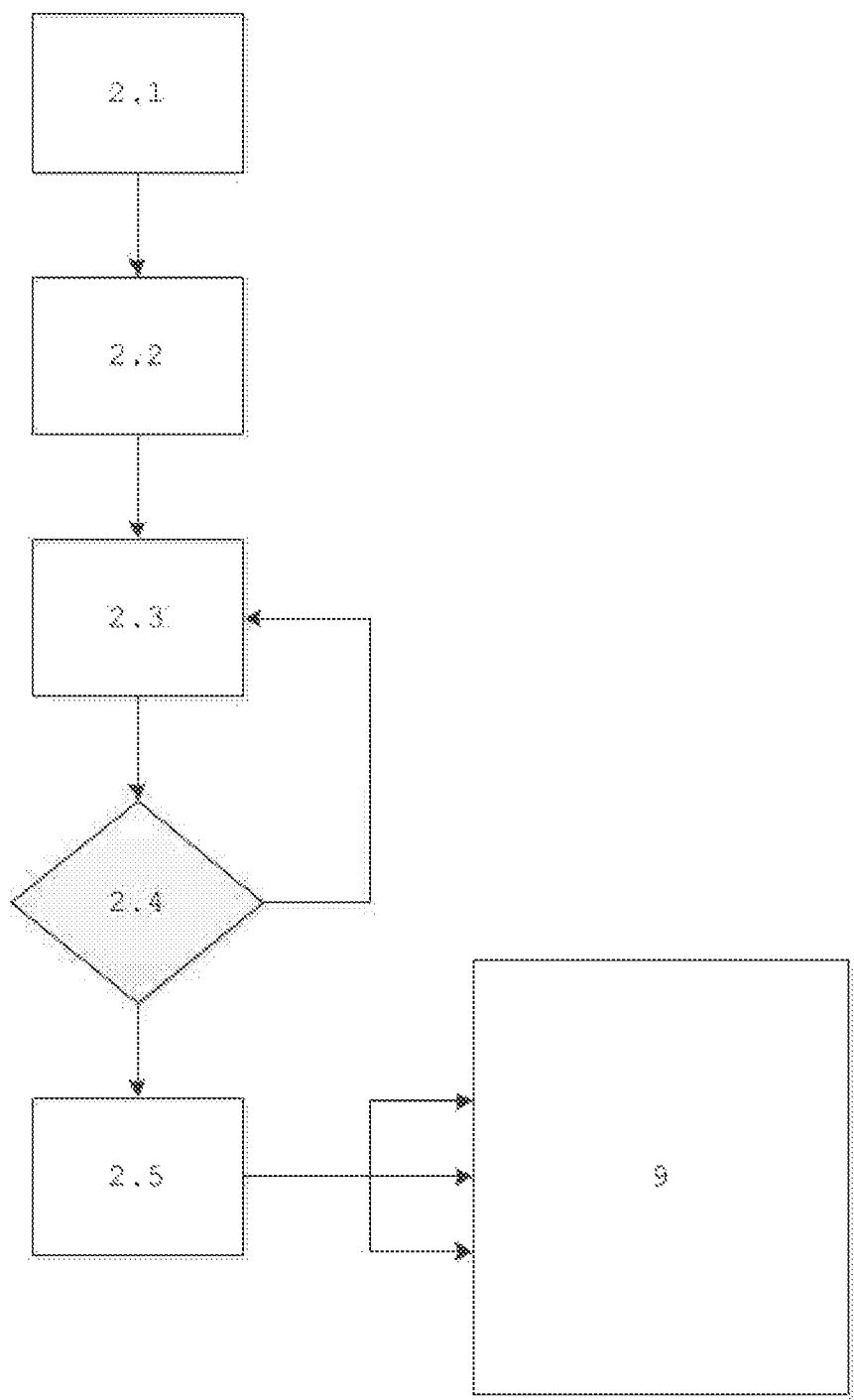
FIG. 2 shows a flowchart relative to the operating method of the cutting machine, according to the control algorithm executed in the central control unit, wherein reference numbers represent:
2.1—initial parameterization;
2.2—start of the drilling process;
2.3—reading and processing of data from a sensory block;
2.4—detection of intersections;
2.5—acting on the cutting parameters of the cutting machine;
9—cutting machine.
Figure 3:
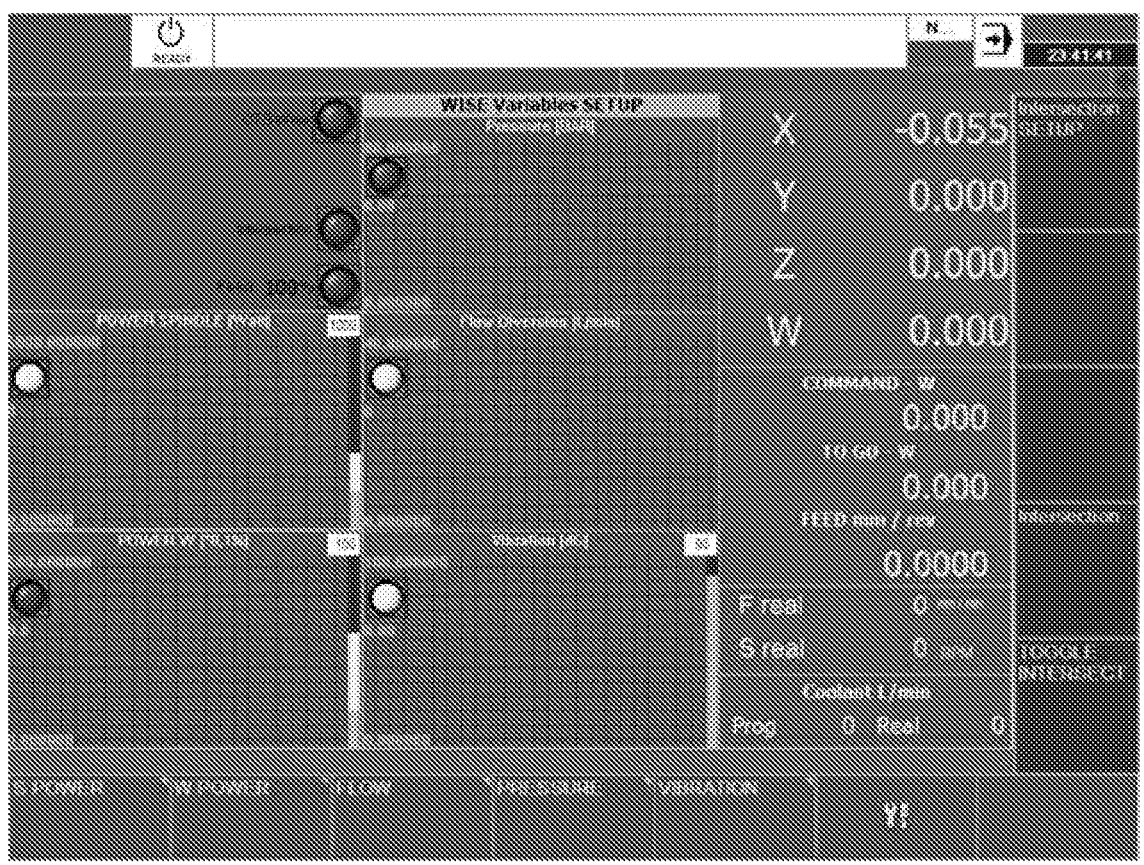
FIG. 3 shows the interface of the control method, which is executed in the processing unit of the central control unit, when performing intersection detection.

The operating system and method herein developed arise from the need to monitor and automate the entire deep hole drilling, drilling and milling processes, in cutting machines (9), in order to not only optimize the relevant task performance but also to increase the useful life of the cutting drilling tools involved.

The technology developed thus allows controlling the entire deep hole drilling, drilling and milling processes, acting directly and automatically on the control of the cutting parameters, such as for example drilling feed and cooling adjustment, by means of collecting and real-time analyzing of data from sensors (4) installed in said cutting machine (9).

The control method is executed in a central control unit (8), which may be internal to the cutting machine (9) itself or external thereto, in which case it is connected via a wired or wireless generic communication protocol. The central control unit (8) comprises a data input interface (5), which allows the operator to enter the initial cutting settings required to program the machine. In addition, it is also provided with a monitor (5) that displays in real time the graphics related to the monitoring of the cutting parameters and respective variables, throughout the entire cutting process.

The central control unit (8) is provided with processing capacity (1) adapted to the execution of control algorithms, further comprising a communication module (2), specially configured to connect with the set of sensors (4) coupled to the cutting machine and which intervene in the control process. In addition, it also comprises an internal memory unit (3) wherein the initial parameterization (2.1) carried out by the operator, the updates of said parameters throughout the process, and specific parameterizations associated with past works, indexed to the type of material are stored.

The central control unit (8) further comprises an—audible or luminous—alarm mechanism (6) and a button (7) enabling the operator to take manual control of the cutting machine (9) at any stage of the process.

The variables monitored (2.3) along the cutting process (2.2) are the shaft power (rotating axis), power of the axis W (linear axis), flow rate (liters per minute), pressure (bar) and vibration (G).

The variables associated with measuring the axes power of the cutting machine (9) are related to the control of the drilling feed parameter. Indeed, raw materials such as steel, iron or aluminum in themselves have different physical characteristics, in particular in terms of hardness of said materials, which has direct implication on the strength to be used in each machine axis so as to execute the cutting task (2.2). This variation of strength is reflected in the electric power consumed by both axes, which is proportional to the strength applied.

The continuous monitoring (2.3) of these parameters thus allows controlling the individual or joint operation of the motors of the shaft and W axis, so as to ensure that the electric power consumed is always within a suitable range, hereinafter referred to as green reference for language simplicity. The programming of said range is carried out in the first instance by the operator (2.1), and then continuously updated automatically throughout the entire cutting process (2.2). However, ideally it would be desirable for electric power indices to be within the green range throughout the entire deep hole drilling process. However, the same material may exhibit discontinuities with respect to its hardness along the block defining it, which may be reflected in an increase in the electric power consumed by placing it within a range of values, designated yellow range, which lead to triggering the control of the drilling feed. This control acts directly on the motors of the shaft and W axis so as to adjust—decrease in the case of an increase of electric power detected—the drilling feed and with this restore the power consumed again to the green range.

If for some reason the electric power consumed reaches an excessive value, red reference, the control method automatically stops the cutting process by emitting an alert signal in a luminous or audible way. It should be noted that the threshold power value is defined by the operator at the initial moment, which can be subsequently updated automatically along the process according to the characteristics of the material. In this situation, the automatic control is terminated and the operator may then, if so desired, resume manual control of the process by means of a potentiometer—button (7) of the central control unit (8)—which allows adjusting the drilling feed.

Monitoring the power consumed is crucial to identify the presence of intersections in the material where the drilling is being performed. These are identified through a sharp—fast—decrease in the power consumption of the shaft motor. Indeed, in the drilling process, when an intersection is reached the tip of the cutting tool is left unguided. In this situation, it is necessary to reduce the drilling feed so as to cross the intersection zone until the tool tip touches again the material and continues with the work according to the programmed parameters. If the drilling adjustment (2.5) does not take place, a major impact will occur when the cutting tool tip touches the material again, damaging the cutting edge of the tool tip and, consequently, creating deviations in the programmed drilling.

The intersection control (2.4) is then performed by monitoring the power curve of the shaft motor by calculating the derivative at a point in the curve for a decrease in power. Indeed, in mathematical terms, such a power decrease is reflected in a negative slope of the line tangent to said point. However, in order to make said intersection control robust by avoiding "false" detections, two control parameters relating to amplitude and time constants associated with the slope calculation of the line are introduced, allowing to interpret the power decrease in the relevant time period and thus to detect any discontinuities in power consumption that arise from the physical specificities—hardness—of each material, or initial errors from poor parameterization.

Once the intersection is detected, it is important to define the intersection distance, which can be programmed in 3 different ways:
1. Defined by the operator;
2. Dependent on tool radius;
3. Dependent on the length of the gun drill head.

Option 1 is ideal when the operator knows in advance about the presence of an intersection and its length, so that he may directly enter the millimeter value intended for the intersection distance.

On the other hand, option 2 allows to calculate the distance of the intersection to be applied automatically, from the radius of the cutting tool and upon the application of a multiplicative factor N, both parameters initially defined by the operator.

In case of option 3, the distance of the intersection corresponds to the length of the gun drill head, defined when the operator has configured the tool.

After detecting the beginning of the intersection, the controller will go through the distance defined by any of the 3 options presented to, after this distance, consider the end of the intersection. During this period, specific cutting parameters can be loaded, such as for example a different setting for the drilling feed or vibration index, which allows the cutting machine to adjust and optimize its operation accordingly.

Along with the drilling feed adjustment, another monitored cutting parameter is related to the cooling control of the cutting tool. In deep hole drilling, the cooling of the cutting tool—gun drills—is performed by the inside of the tool. The gun drill has a V shape to eject the chips resulting from cutting the material. The implemented cooling control acts directly and automatically in the operation of a motor-pump that regulates the output of more or less coolant in the tool. The operation control is done by programming a certain analog voltage to the terminals of the variable speed drive which defines the motor-pump rotations and consequently the output frequency of said coolant. This value is programmed initially by the operator and can be changed automatically along the process so as to fit the specificities of the material.

The cooling control can be performed by monitoring the flow rate or pressure parameters, using analog sensors for this purpose. For each tool, manufacturers recommend using the flow rate or pressure parameter, but the operator will enter that choice into the command. The selection of one parameter over another has only and exclusively to do with the characteristics of the desired drilling, i.e. for larger cutting diameters a flow rate control is desired, whereas for smaller diameters a pressure cooling control is found to be the most appropriate. The goal shall always be to keep the lowest value possible in the actual-programmed difference, working in a closed-loop control strategy.

Vibration is also a parameter monitored in the drilling process, having an important impact on the perfection of the final work. For the monitoring of said parameter, an analog sensor is coupled to the shaft axis allowing to measure and interpret the vibrations of the machine structure. Also in this case, a vibration threshold value is initially programmed which, once exceeded, triggers the alarm mechanism.

The present description is of course in no way restricted to the embodiments presented herein and a person of ordinary skill in the art may provide many possibilities of modifying it without departing from the general idea as defined in the claims. The preferred embodiments described above are obviously combinable with each other. The following claims further define preferred embodiments.

The invention claimed is:

1. Method for operating a control operation system of a cutting machine, wherein a central control unit is configured to monitor and control the operation of the cutting machine, automatically and in real-time, the method comprising:
   programming in an interface device of the control operation system an initial parameterization by an operator, according to a type of material intended for drilling;
   starting a drilling process;
   reading and processing data sent from a sensory block of the control operation system; if a tip of the cutting tool is left unguided, an intersection is detected, and the following cutting parameters are adjusted:
   drilling feed, acting directly on the cutting machine, in particular on a motor thereof, which coordinates power delivered to a rotating and linear axes;
   cooling the cutting tool, acting directly on a cooling circuit of the cutting machine; and
   vibrating the rotating axis of the cutting machine;
   wherein the adjustment of the drilling feed and the detection of intersection, a cooling control and a vibration control are performed by comparing values collected by a power, pressure or flow rate and vibration sensors, respectively, of the sensory block, with values of the cutting parameters programmed in the initial parameterization carried out by the operator.

2. Method according to claim 1, wherein the drilling feed adjustment step is triggered when a total electric power consumed by the rotating and linear axes is higher than a value initially programmed by the operator.

3. Method according to claim 1, wherein the detection of intersections involves continuous monitoring of a power curve of the rotary motor by calculating updates at a point in the curve in order to obtain a slope of a tangent line at that same point.

4. Method according to claim 3, wherein the intersection is detected when the slope of the line is negative, for a time and amplitude constant previously defined by the operator in the initial parameterization.

5. Method according to claim 1, wherein the central control unit stores in memory the initial parameterization carried out by the operator, updates of said cutting parameters throughout the cutting process, and specific parameterizations associated with past works, indexed to the type of material intended for cutting.

6. Method according to claim 3, wherein the central control unit automatically loads specific cutting parameters when the intersection is detected.

7. Method according to claim 1, wherein the operator takes control of the cutting machine by actuating a manual button of the control operation system.

8. A control operation system for a cutting machine, further comprising:
- a central control unit, configured to operate according the method of claim 1, provided with processing capacity and internal storage memory, said central control unit further comprising a communication module specially configured to establish a communication for transferring control information with the cutting machine and for receiving sensorial data from the sensory block;
- the sensory block, comprising a set of sensors which are coupled to the cutting machine;
- the interface device, directly connected to the central control unit, adapted to establish a bidirectional communication with the operator either for inputting initial parameterizations or for displaying control information;
- an alarm mechanism; and
- a manual control button.

9. System according to claim 8, wherein the sensory block comprises at least two power sensors, at least one flow rate sensor, at least one pressure sensor and at least one vibration sensor.

10. System according to claim 9, wherein the at least two power sensors are coupled to the rotating axis and to the linear axis of the cutting machine motor, respectively.

11. System according to claim 9, wherein the at least one flow rate sensor and the at least one pressure sensor are coupled to the cooling circuit associated with the cutting machine.

12. System according to claim 9, wherein the at least one vibration sensor is coupled to the rotating axis of the cutting machine motor.

13. System according to claim 8, wherein the interface device comprises a screen with tactile technology.

14. System according to claim 8, wherein the manual control button is of a potentiometer type.

* * * * *